United States Patent [19]
Morrow et al.

[11] Patent Number: 5,117,967
[45] Date of Patent: Jun. 2, 1992

[54] CONVEYOR BELT CLEANING APPARATUS

[76] Inventors: William L. Morrow, 9630 W. 41st Ave., Wheat Ridge, Colo. 80033; Laszlo A. Gombas, 23768 Shooting Star Dr., Golden, Colo. 80401; John W. DeLine, 6100 E. 6th Ave., Denver, Colo. 80220

[21] Appl. No.: 656,163

[22] PCT Filed: Aug. 25, 1989

[86] PCT No.: PCT/US89/03693
§ 371 Date: Feb. 25, 1991
§ 102(e) Date: Feb. 25, 1991

Related U.S. Application Data

[63] Continuation-in-part of Ser. No. 366,358, Jun. 15, 1989, abandoned, which is a continuation-in-part of Ser. No. 237,526, Aug. 26, 1988, abandoned.

[51] Int. Cl.⁵ .............................................. B65G 45/00
[52] U.S. Cl. .................................... 198/495; 198/494
[58] Field of Search .............. 198/493, 494, 495, 500; 15/256.5, 256.51, 250.42, 104.93, 104.94, 118, 209 R, 210 R, 210 A, 210 B

[56] References Cited

U.S. PATENT DOCUMENTS

| | | |
|---|---|---|
| 1,543,411 | 6/1925 | Wittig . |
| 3,815,728 | 6/1974 | Vaughan .................. 198/495 |
| 3,941,241 | 3/1976 | Hishitani .................. 198/494 |
| 3,946,853 | 3/1976 | Ishida et al. ............. 198/495 X |
| 4,344,361 | 8/1986 | MacPhee et al. ........ 198/494 X |
| 4,755,252 | 7/1988 | Held ......................... 198/494 X |

FOREIGN PATENT DOCUMENTS

| | | |
|---|---|---|
| 0266627 | 5/1988 | European Pat. Off. .......... 198/495 |
| 2505874 | 8/1976 | Fed. Rep. of Germany ...... 198/495 |
| 2950346 | 6/1981 | Fed. Rep. of Germany . |
| 0235118 | 10/1981 | Japan ....................... 198/495 |
| 914432 | 3/1982 | U.S.S.R. . |

*Primary Examiner*—D. Glenn Dayoan
*Attorney, Agent, or Firm*—Kyle W. Rost

[57] ABSTRACT

A free-standing cleaner (10) for conveyor belts (60) constitutes a tank (12) for holding fluid and having a removeable pad (22) attached across its bottom surface (14). Nozzles (20) in the bottom surface deliver the cleaning fluid to the pad (22). One longitudinal end (18) of the tank depends from the majority of the bottom surface (14) and hooks over the upstream end of the conveyor for anchoring the tank (12) against movement with the conveyor belt (60). Tandem tanks may be joined to the downstream end of the first tank for applying multiple cleaning fluids to the belt (60).

20 Claims, 1 Drawing Sheet

U.S. Patent June 2, 1992 5,117,967
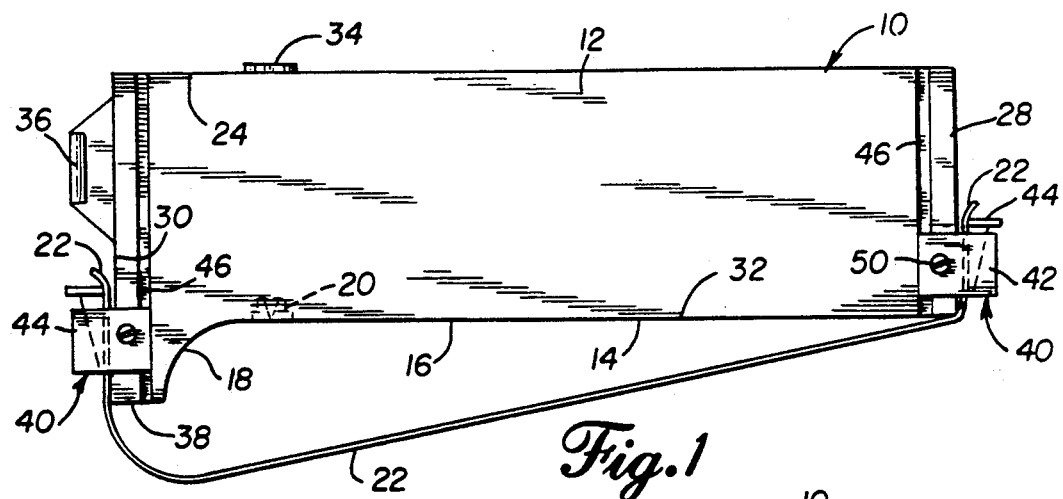
Fig.1
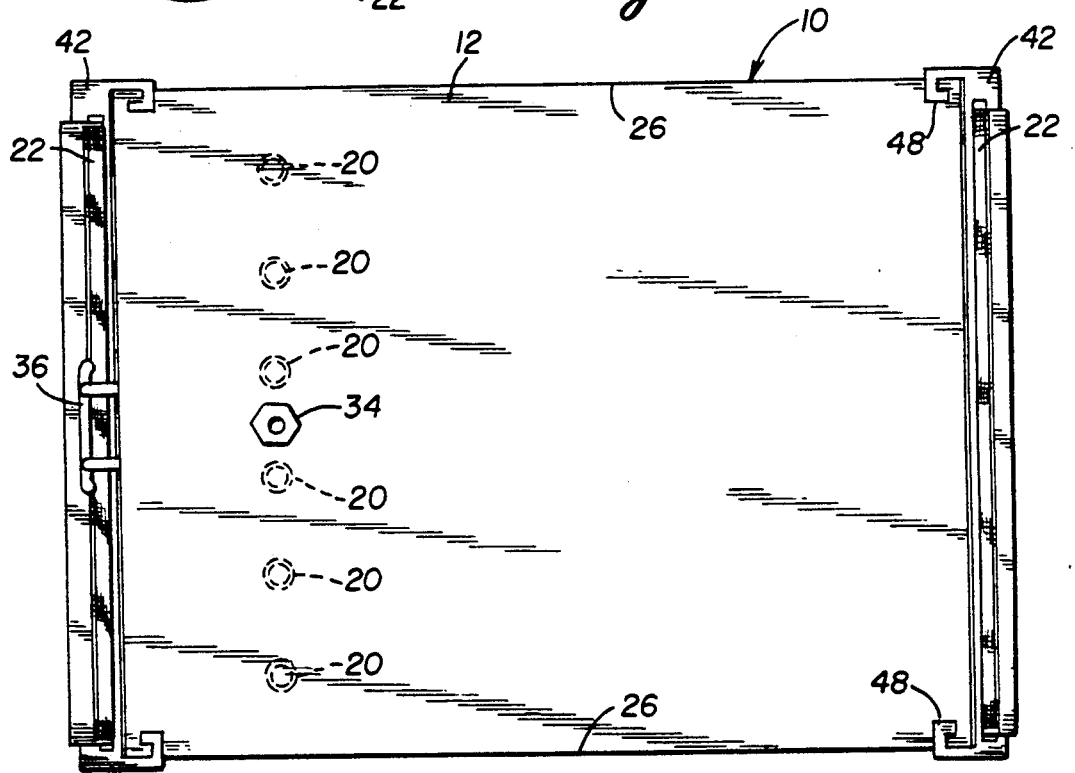
Fig.2
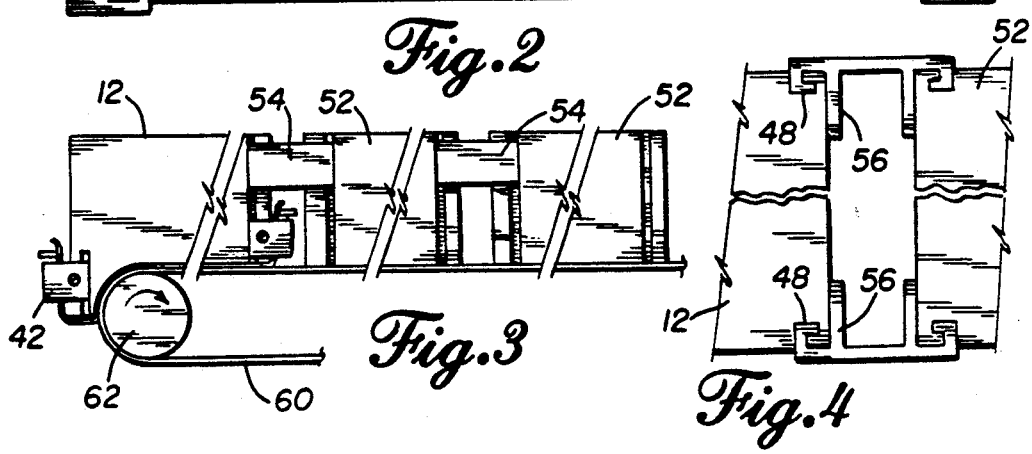
Fig.3
Fig.4

CONVEYOR BELT CLEANING APPARATUS

This application is a continuation-in-part of application Ser. No. 366,358 filed Jun. 15, 1989, now abandoned; which is a continuation of application Ser. No. 237,526 filed Aug. 26, 1988, now abandoned.

BACKGROUND OF THE INVENTION

1. Field of the Invention

The invention generally relates to power-driven conveyors and to conveyors having a means to facilitate cleaning the conveyor or sterilizing means.

2. Description of the Prior Art

It is necessary to clean and sterilize the conveyor belt in the food processing industry as well as in other situations. A number of scrapers and wipers have been developed to do this job. It is desired to accomplish the best possible cleaning job, which often is judged by a bacteria count taken from the cleaned belt. Also, it is desired to accomplish the job by the easiest, least costly method.

A number of patents have disclosed methods and apparatus for cleaning conveyor belts. One is West German Patent No. 2,950,346, which shows a conveyor belt cleaner that includes a reservoir trough from which a cleaner belt picks up cleaning fluid and transfers it to the belt to be cleaned. The cleaner belt is moving in the opposite direction to the conveyor belt and simultaneously applies cleaning fluid and scours the conveyor belt. The cleaner belt is power-driven and appears to operate against the conveyor belt on a full time basis.

West German Patent No. 2,505,874 shows a cleaner for escalator handrails. The cleaning liquid is transferred to the handrail by application rollers, at least one of which rotates in a direction opposite to the handrail. Alternatively, an endless sponge or brush band applies the fluid while rotating oppositely to the handrail.

U.S. Pat. No. 3,946,853 to Ishida discloses a solution-bearing pad that is resiliently biased into contact with a moving belt in order to clean, polish, or disinfect an escalator handrail. The pad is secured by a C-shaped housing that is engaged over the sides of the handrail, and, apparently, the housing eventually rests against some fixed portion of the escalator so that the belt slides through the pad.

U.S. Pat. No. 3,941,241 to Hishitani discloses a similar escalator cleaning pad and housing, except that this housing is firmly connected to a fixed part of the escalator by a fastener.

Russian Patent No. 914,432 discloses a conveyor belt cleaning system in which an endless tape is sprayed with solvent and then moves against the dirty side of the belt as both belt and tape ride over a tape drum. Subsequently, the tape travels through a water tank and is pressed against a drying roller.

U.S. Pat. No. 1,543,411 to Wittig discloses a belt cleaner having a spray header that wets the belt. At a downstream location a rotating brush cleans the belt, while further downstream the knife scrapes the belt.

U.S. Pat. No. 4,344,361 to MacPhee et al. discloses a cleaner for a blanket cylinder. The cleaner advances a cloth sheet between a supply roll and a take-up roll. Between the two rolls, water and solvent are supplied to the cloth, and an inflatable bladder presses the cloth against the cylinder for cleaning.

Although these types of belt cleaners are known, it would be desirable to have a belt cleaner that need not be permanently installed on the belt, but rather could be applied when necessary and then removed to another area so that the belt cleaner could be cleaned and prepared for the next use.

Also, it would be desirable to have a suitable structure to enable the belt cleaner to be applied to substantially any conveyor belt without specially adapting the conveyor to receive the cleaner.

Another desirable feature is to have a belt cleaner that carries its own supply of cleaning solution so that the cleaner is not dependent upon the absorbency of the pad to handle the cleaning requirements of the entire belt.

Still another desirable feature is to have a belt cleaner that can quickly and inexpensively be cycled for repeated use.

To achieve the foregoing and other objects and in accordance with the purpose of the present invention, as embodied and broadly described herein, the conveyor belt cleaning apparatus and method of this invention may comprise the following.

SUMMARY OF THE INVENTION

Against the described background, it is therefore a general object of the invention to provide an improved conveyor belt cleaner that is self-retained in the desired location for performing its cleaning function.

Another object is to provide a belt cleaner that is capable of carrying its own cleaning solution and automatically supplying this solution.

An important object is to provide a belt cleaner that has high cleaning capacity so that it can rapidly clean conveyor belts even in food processing plants, where cleaning requirements are severe.

A further object to to provide a belt cleaning apparatus that replaces the need for hand scrubbing of belts in food processing plants and accomplishes the cleaning functions in an even manner over the food contact surface of the belt.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a conveyor belt cleaning apparatus provides a tank having a bottom surface with a substantially flat, planar portion joined near its forward end to a downwardly curved portion. A fluid absorbent pad carried by the tank over the tank's bottom surface. Orifices apply fluid from the tank to the pad.

According to another aspect of the invention, a conveyor belt cleaning apparatus provides a tank having a bottom surface with a generally planar, pressure-applying surface portion for, in use, overlying a substantially straight run of conveyor belt and a depending hooking surface for, in use, engaging a reverse bending portion of a conveyor belt. A fluid dispensing device discharges fluid from within the tank to the proximity of the bottom surface of the tank. A pad fastening means attaches a wiping pad across the bottom surface of the tank.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 1 is a side elevational view of the belt cleaner, with portions of the pad fastener shown in phantom.

FIG. 2 is a top plan view of the belt cleaner, with the fluid dispensing nozzles on the bottom of the apparatus shown in phantom.

FIG. 3 is side elevational view of the belt cleaner as applied to a conveyor belt and with optional cleaner units in tandem.

FIG. 4 is a top plan view of the junction between two tandem cleaner units, showing the joining means.

DESCRIPTION OF THE PREFERRED EMBODIMENTS

With reference to the embodiment of the invention shown in FIGS. 1 and 2, the conveyor belt cleaning apparatus 10 is a free standing tank 12 or similar container capable of holding a liquid. The lower surface 14 of tank 12 is configured in at least two portions in longitudinal alignment. The first is a substantially flat, planar, pressure applying surface 16, and the second is a depending, downwardly curved, hooking surface 18 located near the forward end of the first surface portion. In addition, the tank is supplied with a means for discharging or feeding fluid from within the tank to the proximity of its bottom surface. A nozzle 20 or other fluid passage orifice is suitable for this purpose. Finally, the tank carries a fluid absorbent pad 22 over the bottom surface, where the fluid discharge means may apply fluid to the pad.

The tank 12 is a fluid carrying chamber and may be either open or closed, although a closed tank is preferred from the standpoint of ease of use. Thus, the tank may have a top wall 24, a pair of right and left side walls 26, a rear wall 28, a front wall 30, and a bottom wall 32. Together, these walls define an enclosed interior chamber that may hold a suitable cleaning solution for application to a conveyor belt.

The cleaning solution typically is a liquid and may be a wetting agent, water, bleach solution, or combinations of these elements. Many cleaning solutions are known for the purpose of cleaning conveyor belts, and the exact solution used is a matter to be coordinated with the cleaning requirements of the environment of each conveyor belt. It may be noted that the tank may be formed of a chemically impervious material such as rubber, plastic or other synthetic, so that the selected cleaning material is harmless to the tank. In addition, the fluid discharge orifices may be sized to accommodate the chosen fluid.

The tank has an interior volume defined by the various enclosing walls. It is desired that the tank have considerable mass so that it will be capable of remaining stationary above a moving conveyor belt merely by the hooked relationship of the bottom surface portion 18 over the end reverse curve of the belt. Thus, the walls may have considerable thickness and, if desired, may be formed of dense materials or may contain ballast of denser materials. For example, it has been found desirable for a tank having about sixteen inch width and twenty-four inch length to have a minimum weight of fifteen pounds. Of course, another technique for achieving this weight is to operate the cleaner with sufficient residual liquid in a tank of any empty weight.

The weight and balance of the tank are designed to aid its free-standing nature. The tank is provided with a filler cap 34 of the self-venting variety, which are well known commodities. As shown in FIGS. 1 and 2, this cap is preferred to be located near the front wall 30, at a position similar to the illustrated longitudinal position of the orifices 20. In addition, one or more handles 36 may be attached to the tank for ease of handling. At least one handle 36 is preferred to be located on the front wall 30 so that the tank can be carried with the front wall in top position. This orientation allows the fluid in the tank to be pooled in the rearward area of the tank and, correspondingly, to avoid leakage at the cap 34 or orifices 20. Additional handles or inset hand grip areas may be supplied as desired in the side and end walls. The front wall 30 may have considerable thickness, extending rearwardly almost to the filler cap and orifices in order to locate a permanent mass over the downward curve 18 of the lower surface of wall 32.

Lower surface 14 of wall 32 is the working surface of the tank. Rearward portion 16 typically is longitudinally planar or generally so, in order to provide a broad, pressure applying area that will overlie a flat run of conveyor belt. This surface may have texture or raised pattern as may be desired to assure or assist uniformity of contact as portion 16 presses the pad 22 against the belt. Special configurations such as longitudinal grooves, ribs, curves, or troughs may be molded into this section of the surface 14 as desired to conform to the configuration of a specific belt.

The forward portion 18 of lower surface 14 depends from the longitudinal plane of surface portion 16. This depending surface portion 18 is preferred to be a curve, although other configurations such as a straight wall may be employed. Portion 18 constitutes a hook or like anchoring means that is placed over the end of the conveyor belt, a the rear reverse bend. Thus, the typical conveyor belt will rise through this reverse bend and move under wall 32 from the front surface portion 18 toward the rear surface portion 16. It is primarily portion 18 that secures the tank against moving with the belt. If the curve 18 ends at a distance from front wall 30, the lower surface may include an additional bottom wall surface 38 connecting the lower end of the curve to wall 30.

The fluid dispensing orifices or nozzles 20 are formed or mounted in bottom wall 32. In the simplist embodiment, it has been found that six orifices of 0.045 inch diameter, spaced in lateral alignment about 2½ inches apart, are well suited for use with a tank having a width of sixteen and one-half inches. In other embodiments, the nozzles 20 may be of the screw-in type to permit a choice of orifice size. Adjustable orifices allow the flow rate of the solution in the tank to the pad 22. Flow may be adjusted to accommodate different belt speed, belt length, or specific cleaning situations, such as if it is desired to saturate the conveyor belt. The orifices are gravity fed and feed the cleaning solution directly from the tank to the general proximity of the bottom surface of wall 32. When pad 22 is in place and the tank is in operation on a conveyor belt, the solution is delivered onto the pad. Thus, the number, size and position of the orifices will control fluid feed to the pad. The orifices are preferred to be near the forward end of surface portion 16 so that they set the pad 22 near the upstream end of the pad. Although other feed systems might be used, gravity feed is preferred for its simplicity and its contribution to the free-standing nature of the tank.

The pad 22 is a fluid absorbent cloth or similar wipe. It is preferred to be mounted to the tank 12 between the front wall 30 and rear wall 28, with sufficient slack to permit the pad to conform to the configuration of the bottom surface 14. The width of the pad should be substantially as great as bottom surface 14. The mounting between the pad and the tank is preferred to be of a removeable type. Thus, one type of mounting could be by adhesive, while another could be by reuseable fasteners, such as snaps, buttons, Velcro, or friction fasteners. The preferred wipe or pad is disposable.

A preferred pad fastening means is shown in FIGS. 1 and 2 to be a wedge lock friction fastener 40. One such fastener may be mounted at each of the front and rear walls of the tank. This fastener may include a bracket 42 attached to the side walls of the tank and extending across and spaced longitudinally from the respective front and rear walls. Held between the bracket and its respective front or rear tank wall is a laterally extending wedge shaped fastening bar 44. A pad may be installed and locked in such a fastener by being inserted between the bar 44 and the abutting end wall of the tank. Thereafter, the bar is depressed into the bracket to frictionally lock the pad in place. Pulling forces exerted from the bottom side of the bracket tend to pull the bar more firmly into the bracket, increasing the strength of the grip on the pad.

The tank may have vertical L-shaped grooves 46 formed in side walls 26 near both the front and rear end walls. As shown in FIG. 1, the grooves 46 extend upwardly from the bottom wall 32. At least the rear grooves 46 extend the full height of the tank 12 and may be entered from either the top or bottom. Brackets 42 may be carried in grooves 46 by C-shaped carriers 48. Each carrier 48 may have a set screw 50 for clamping the bracket at the desired height in groove 46.

With reference to FIG. 3, tank 12 may be used in series with one or more trailing tandem tanks 52. Each tandem tank 52 is similar to tank 12, but lacking the depending bottom portion 18. Thus, tanks 52 have a substantially flat bottom surface over the entire bottom wall. These tanks otherwise may have their own nozzles 20, handles 36, pad fastening means 40, and mounting grooves 46. The tanks are held in tandem position by interconnecting means such as tethers or brackets, with joining brackets 54, shown in FIG. 4, being a preferred device. The joining brackets employ C-shaped carriers 48, as previously described, to connect the rear groove 46 of either lead tank 12 or tandem tank 52 to the front groove 46 of a trailing tandem tank 52. The joining brackets 54 may have an abutting spacer 56 opposing each carrier 48 to maintain a predetermined gap between juxtaposed tanks.

When tandem tanks are employed, each may carry within it a different liquid product. For example, if three tanks are employed, the lead tank 12 may carry a wetting agent. The center tank may carry a scrubbing agent, which may be water. The trailing tank may carry a bleaching agent. In addition to carrying different cleaning solutions, the tanks may employ different pads 22. For example, the pad on the center, scrubbing tank may be coarser, while the pad on the trailing, bleaching tank may be more absorbent.

According to one arrangement, the invention is inclusive of conveyor belt cleaning apparatus such as tank 52 having a forward end, rearward end, and two lateral sides, capable of carrying a supply of fluid, and having a bottom surface with a substantially planar surface. The tank 52 is characterized by the substantial absence of lateral sides depending below the planar bottom surface so as, in use, to be capable of overlying the top surface of a substantially straight run of conveyor belt. A fluid absorbent pad 22 is carried by the tank 52 over this bottom surface, and the tank further includes a means for applying fluid from the tank to the pad. A tether is connected to the tank 52 and, in use, is connectable to an external object to hold the tank in place over a moving conveyor belt. Thus, the cleaning apparatus may be merely placed over a conveyor belt and is retained against being transported along the belt by the tether.

According to another arrangement of the invention, the tank 52 is capable of containing fluid and has a bottom surface with a generally planar, pressure applying surface for, in use, overlying a substantially straight run of conveyor belt. The substantial absence of depending lateral sides enables the bottom surface to apply pressure to the top of a conveyor belt across the width of the bottom surface. The fluid dispensing means is capable of discharging fluid from within the tank to the proximity of the bottom surface of the tank. There is included a pad fastening means 40 for attaching a wiping pad longitudinally across the bottom surface of the tank. Also included is a tether for, in use, connecting the tank to an external object for preventing the tank from moving with the belt.

A single example of the specific dimensions of the belt cleaner may offer some insight into the construction of still other sizes. The tank 12 is about twenty-one inches from end wall to end wall. Bottom wall surface 38 is about one inch. Curved wall surface 18 is on a two inch radius and covers about a ninety degree arc. This wall surface smoothly joins surface 14 on a tangent, with the result that surface 14 is about eighteen inches long. The nozzles 20 are set back from the front wall 30 by about three and three-quarter inches. The height of the tank at the front wall is about eight inches, and the height at the rear wall is about six inches. In this configuration, the belt cleaner operates in a satisfactory manner.

In operation, the tank 12 is employed as a free-standing device that requires no special fixtures on the conveyor before being used on a typical, flat belt conveyor 60, FIG. 3. The tank is filled through filler cap 34 with any desired cleaning solution, as appropriate to the job. A clean pad 22 is installed in the pad carriers 40. Then the tank is placed over the end of the conveyor belt 60, with the belt rising over the end roller 62, as shown by the arrow in FIG. 3. The front end of the tank 12 extends beyond the end of the conveyor belt and depending surface 18 retains the tank against being transported along the conveyor on the belt.

Flat surface 16 is applied over the pad 22 to press the pad against the top surface of the belt. The cleaning solution is dispensed by gravity through orifices 20 into the pad near the front of the tank. The solution works its way toward the rear of the pad by absorption in the pad and by the wiping action of the conveyor belt against the pad. The weight of the tank is applied over the pad to provide scrubbing pressure, and the pad itself is rubbed by the surface of the belt to both apply the cleaning solution to the belt and to apply scrubbing friction.

Tests run with a single tank 12 in a food processing plant have shown that the belt cleaner 10 effectively cleans an entire belt with approximately eight minutes of belt operation. In that time, the belt is cleaned sufficiently to remove protein build-up and thus restore the typical white color. In addition, the belt passes USDA standards with swab culture tests. Use of the cleaner saves a considerable amount of labor and eliminates the need to hand scrub each belt. Furthermore, the belt cleaner 10 is economical in its use of cleaning chemicals, since it meters the chemicals and applies them uniformly. The typical splashing and waste of such chemicals, as is found with hand scrubbing, is prevented. Still further, safety is improved by elimination of chemical burns and other types of injury that sometimes occur during hand scrubbing operations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

The embodiments of the invention in which an exclusive property or privilege is claimed are defined as follows:

1. A conveyor belt cleaning apparatus, comprising:
    a first tank carrying a supply of fluid and having a bottom surface with a substantially flat, planar portion joined near its forward end to a downwardly curved portion;
    a fluid absorbent pad carried by said tank over said bottom surface thereof; and
    means for applying fluid from the tank to said pad.

2. The conveyor belt cleaning apparatus of claim 1, wherein said tank comprises a substantially closed chamber having a vented filler cap.

3. The conveyor belt cleaning apparatus of claim 1, further comprising:
    a releasable pad fastening means for connecting an end of said pad near the forward end of said tank.

4. The coveyor belt cleaning apparatus of claim 3, further comprising:
    a second releasable pad fastening means for connecting a second end of said pad near the rear end of said tank.

5. The conveyor belt cleaning apparatus of claim 1, further comprising a releasable pad fastening means having a wedge lock friction fastener.

6. The conveyor belt cleaning apparatus of claim 1, wherein said means for applying fluid comprises a plurality of orifices located in said bottom surface of said tank.

7. The conveyor belt cleaning apparatus of claim 6, wherein said orifices comprise nozzles removeably mounted through said bottom surface of said tank.

8. The conveyor belt cleaning apparatus of claim 1, wherein said pad is of a length at least as great as the longitudinal length of said bottom surface of said tank.

9. The conveyor belt cleaning apparatus of claim 1, further comprising:
    a second tank containing fluid and connected rearwardly of said first tank, wherein the second tank carries a scrubbing pad under its bottom surface and includes means for delivering fluid from within the tank to said scrubbing pad.

10. A conveyor belt cleaning apparatus, comprising:
    a first tank capable of containing fluid and having a bottom surface with a generally planar, pressure-applying surface portion for, in use, overlying a substantially straight run of conveyor belt, and a depending hooking surface for, in use, engaging a reverse bending portion of a conveyor belt;
    a fluid dispensing means for, in use, discharging fluid from within the tank to the proximity of the bottom surface of the tank; and
    a pad fastening means for, in use, attaching a wiping pad across the bottom surface of the tank.

11. The conveyor belt cleaning apparatus of claim 10, further comprising:
    a second tank capable of containing fluid and having a substantially flat bottom;
    means for, in use, dispensing fluid from within the second tank to the proximity of the second tank's bottom surface;
    a pad fastening means for, in use, attaching a wiping pad across the bottom surface of the second tank; and
    joining means for attaching said second tank to said first tank.

12. The conveyor belt cleaning apparatus of claim 11, wherein said first tank has opposite side walls, each defining therein a vertical, L-shaped groove; and
    said second tank has opposite side walls, each defining therein a vertical, L-shaped groove; and
    said joining means comprises:
    a connecting bracket having each longitudinal end thereof shaped to be receivable in said L-shaped grooves of the first and second tanks.

13. A conveyor belt cleaning apparatus, comprising:
    a tank having a forward end, a rearward end, and two lateral sides, capable of carrying a supply of fluid, and having a bottom surface with a substantially planar surface, wherein said tank is characterized by the substantial absence of lateral sides depending below said planar surface so as, in use, to be capable of overlying the top surface of a substantially straight run of conveyor belt;
    a fluid absorbent pad carried by said tank over said bottom surface thereof;
    means for applying fluid from the tank to said pad; and
    a tether connected to said tank and, in use, connectable to an external object to hold the tank in place over a moving conveyor belt, whereby said cleaning apparatus may be merely placed over a conveyor belt and is retained against being transported along the belt by said tether.

14. The conveyor belt cleaning apparatus of claim 13, wherein said tank comprises a substantially closed chamber having a vented filler cap.

15. The conveyor belt cleaning apparatus of claim 13, further comprising:
    a releasable pad fastening means for connecting an end of said pad near the forward end of said tank.

16. The conveyor belt cleaning apparatus of claim 15, further comprising:
    a second releasable pad fastening means for connecting a second end of said pad near the rear end of said tank.

17. The conveyor belt cleaning apparatus of claim 13, wherein said means for applying fluid comprises a plurality of orifices located in said bottom surface of said tank.

18. The conveyor belt cleaning apparatus of claim 17, wherein said orifices comprise nozzles removeably mounted through said bottom surface of said tank.

19. The conveyor belt cleaning apparatus of claim 13, wherein said pad is of a length at least as great as the longitudinal length of said bottom surface of said tank.

20. A conveyor belt cleaning apparatus, comprising:
- a tank capable of containing fluid and having a bottom surface with a generally planar, pressure-applying surface portion for, in use, overlying a substantially straight run of conveyor belt, said bottom surface being characterized by the substantial absence of depending lateral sides for, in use, enabling the bottom surface to apply pressure to the top of a conveyor belt across the width of the bottom surface;
- a fluid dispensing means for, in use, discharging fluid from within the tank to the proximity of the bottom surface of the tank;
- a pad fastening means for, in use, attaching a wiping pad longitudinally across the bottom surface of the tank; and
- a tether for, in use, connecting the tank to an external object for preventing the tank from moving with the belt.

* * * * *